United States Patent
Zetterman et al.

(10) Patent No.: US 8,340,706 B2
(45) Date of Patent: Dec. 25, 2012

(54) CO-EXISTENCE BETWEEN RADIO ACCESS UNITS

(75) Inventors: Tommi Juhani Zetterman, Espoo (FI); Antti-Veikko Sakari Piipponen, Tampere (FI); Kalle August Raiskila, Vantaa (FI)

(73) Assignee: Nokia Corporation, Espoo (FI)

( * ) Notice: Subject to any disclaimer, the term of this patent is extended or adjusted under 35 U.S.C. 154(b) by 934 days.

(21) Appl. No.: 12/222,646

(22) Filed: Aug. 13, 2008

(65) Prior Publication Data

US 2009/0291701 A1    Nov. 26, 2009

(30) Foreign Application Priority Data

May 21, 2008  (FI) ...................................... 20085480

(51) Int. Cl.
*H04B 7/00* (2006.01)

(52) U.S. Cl. .................... 455/515; 455/63.1; 455/67.13; 455/78; 455/448; 455/500

(58) Field of Classification Search .................. 455/448, 455/500, 63.1, 67.13, 78, 550.1, 552.1, 553.1, 455/73, 88, 420, 426.1, 426.2, 451, 452.2, 455/454, 41.2
See application file for complete search history.

(56) References Cited

U.S. PATENT DOCUMENTS

| | | | |
|---|---|---|---|
| 2003/0083095 A1* | 5/2003 | Liang | 455/552 |
| 2003/0125019 A1* | 7/2003 | Bajikar | 455/420 |
| 2007/0206631 A1 | 9/2007 | Parts et al. | |

FOREIGN PATENT DOCUMENTS

| | | |
|---|---|---|
| EP | 1605643 A1 | 12/2005 |
| WO | WO 2007/096683 A1 | 8/2007 |
| WO | WO 2007/103888 A1 | 9/2007 |
| WO | WO 2008/000903 A1 | 1/2008 |
| WO | WO 2008/020278 A2 | 2/2008 |

OTHER PUBLICATIONS

International Search Report dated Jul. 31, 2009 for Application No. PCT/FI2009/050298.

* cited by examiner

*Primary Examiner* — Fayyaz Alam
(74) *Attorney, Agent, or Firm* — Squire Sanders (US) LLP (57) ABSTRACT

In a non-limiting and exemplary embodiment, a method is provided for controlling co-existence of multiple radio access units. The method comprises: receiving a scheduling request comprising value information on at least some of radio independent scheduling parameters of a control interface common to a plurality of radio access units, scheduling radio access on the basis of the value information on at least some of the radio independent scheduling parameters, and sending a response to the scheduling request in a given form in accordance with the control interface common to the radio access units.

26 Claims, 4 Drawing Sheets

CO-EXISTENCE BETWEEN RADIO ACCESS UNITS

FIELD

The invention relates to arranging co-existence between radio access units.

BACKGROUND

Current digital mobile communication devices include a number of radio units. In some multi-radio terminals there needs to be means to control band usage to avoid disruptions to the performance of the device due to self-inflicted interference. Particularly, when two or more devices operate in the same frequency band, there is mutual interference between the two wireless units that may result in severe performance degradation. Hardware techniques, isolation or filtering, may be applied to reduce such interference, but these may be undesirable due to increased device costs, for instance.

IEEE has specified practices to enhance co-existence between wireless local area networks (WLAN) specified in IEEE 802.11 and personal area networks (PAN), such as Bluetooth, specified in IEEE 802.15. These techniques apply the 2,4 GHz unlicenced band.

However, interference reduction measures may need to be taken also for radios operating in a band close to a band of another radio. There is a need to further develop co-existence awareness for co-existence of current and future radios.

BRIEF DESCRIPTION

Methods, apparatuses, and computer program products are now provided which are characterized by what is stated in the independent claims. Some embodiments of the invention are described in the dependent claims.

According to an aspect of the invention, a method is provided for arranging co-existence of radio access units in a radio communications device. The method comprises: receiving a scheduling request comprising value information on at least some of radio independent scheduling parameters of a control interface common to a plurality of radio access units, scheduling radio access on the basis of the value information on at least some of the radio independent scheduling parameters, and sending a response to the scheduling request in a given form in accordance with the control interface common to the radio access units.

According to another aspect, a method is provided for a radio access unit, the method comprising: generating a scheduling request comprising value information on radio independent scheduling parameters in a given form in accordance with a predefined control interface common to a plurality of radio access units, sending the scheduling request to a multi-radio controller, receiving a response to the scheduling request over the control interface, and controlling radio access transmission or reception in response to the received response.

The term "multi-radio controller" is to be understood broadly to cover various means adapted to control co-existence of multiple radios, and in particular to provide scheduling services and control for the radios. The multi-radio controller may be provided by one or more physical or functional entities.

The invention and various embodiments of the invention provide several advantages, which will become apparent from the detailed description below. One advantage is that it becomes easier to add new radio units to a radio communications device, since it is not necessary to specify and implement a complete radio-specific scheduling control interface for a new radio.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
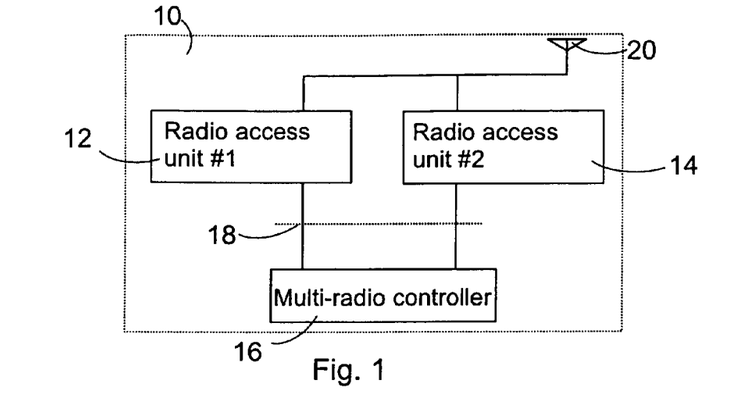
FIG. 1 illustrates an apparatus according to an embodiment.

FIG. 1 illustrates a simplified block diagram of an apparatus 10 according to an embodiment. The apparatus 10 comprises a first radio access unit (RAU) 12, a second radio access unit 14, and a multi-radio controller (MRC) 16 for controlling co-existence between the units 12 and 14. A radio access unit 12, 14, which may also be referred to as a radio access system, communicator or a communications unit, may be a transmitter, a receiver, or a transceiver. The radio access units 12 and 14 are communicatively connectable to an antenna 20. It is to be noted that in an alternative embodiment the units 12 and 14 are connected to separate antennas. The radio access unit(s) 12, 14 may even be located in separate or separable devices.

The MRC 16 is arranged to control co-existence between the RAUs 12 and 14 by providing a radio access scheduling service for the radio access units 12, 14. The MRC 16 may function as a scheduling service controller for providing radio access scheduling services for a plurality of radio access units over a predefined control interface 18 with a set of radio independent scheduling parameters for the radio access units 12, 14. When a RAU 12, 14 needs to receive or transmit, it asks for air access time by sending a schedule request to the MRC 16. The MRC 16 collects requests from different radio units, solves possible interoperability problems and sends decisions back to the radio units 12, 14.

Figure 2A:
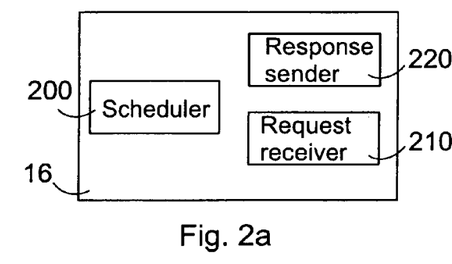
FIGS. 2a and 2b illustrate apparatuses according to an embodiment.

As illustrated in FIG. 2a, an embodiment of a multi-radio controller 16 apparatus and hence the scheduling service controller may comprise a request receiver 210 for receiving scheduling requests comprising at least some of the radio independent scheduling parameters specified for the interface 18 common to the radio access units 12, 14 in a pre-specified form. The apparatus comprises a scheduler 200 for providing radio access scheduling services for a plurality of radio access units 12, 14 on the basis of value information on at least some of the radio independent scheduling parameters in the received scheduling requests. Further, the apparatus may comprise a response sender 210 for sending a response to the scheduling request in a pre-specified form in accordance with the control interface common to the radio access units 12, 14.

Figure 2B:
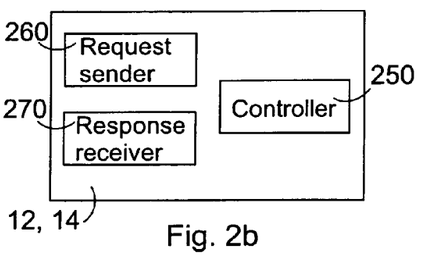

In one embodiment, as illustrated in FIG. 2b, a radio access unit 12, 14 apparatus comprises a controller 250 in charge of the functions related to communicating with the multi-radio controller 16 to use radio access scheduling service over the interface 18. This controller 250 may control the functions related to the features in the radio access unit 12, 14. The controller 250 may be configured to generate a scheduling request comprising value information on radio independent scheduling parameters in a pre-specified form in accordance with a predefined control interface common to a plurality of radio access units. The RAU 12, 14 may also comprise a scheduling request sender 260 configured to send the scheduling request to a multi-radio controller over the interface 18 and a scheduling response receiver 270 to receive a response to the request over the control interface. The controller 250, or a further controller, may be configured to control radio access transmission or reception in response to the received request.

Although the above apparatus has been depicted as one entity, different units and memory thereof may be implemented in one or more physical or logical entities. Although the units are separated in FIGS. 1, 2a and 2b, these functions could be implemented at least partially in a single module or device.

The multi-radio controller 16 may be a single physical apparatus operationally connectable to the radio access units 12, 14. Such a multi-radio controller apparatus may be a chipset, for instance. The chipset or integrated circuit may be suitable for use in a mobile phone or a portable computer, for instance. The scheduling service related functionalities may be implemented at the multi-radio controller apparatus by software, by hardware or a combination thereof.

Similarly, a radio access unit 12, 14 may be a single physical apparatus operationally connectable to the multi-radio controller. For instance, the radio access unit, or further modules thereof, may be a chipset or integrated circuit, which may be suitable for use in a mobile phone. The features may be implemented at the radio access unit apparatus by software, by hardware or a combination thereof.

Some further aspects and embodiments of the above-identified apparatus(es) and the further blocks of FIGS. 1, 2a and 2b are illustrated further in connection with FIGS. 3, 4, 5, and 6. The apparatus thus comprises control means for controlling communications over the radio-independent scheduling service interface common to a plurality of radio access units 12, 14. In particular, means may be provided for arranging the features illustrated in connection with FIGS. 3, 4, 5, and 6. It should be appreciated that the apparatus may comprise other units, but they are irrelevant to the present embodiments and, therefore, they need not to be discussed in more detail here.

The apparatus may be any communications device comprising at least two radio access units capable of interfering with the operation of other radio access units. Some examples of such apparatus include a mobile station or a mobile phone apparatuses, an entertainment device such as a game console, a laptop, a personal digital assistant, or an accessory device.

The apparatus may comprise a plurality of wireless transceivers, for instance operating according to a 2G wireless communications standard, such as the GSM (Global System for Mobile Communications), according to a 3G standard, such as the WCDMA (Wideband Code Division Multiple Access), according to a 4G or further generation standard, according to a WLAN (Wireless Local Area Network), WiMAX, Bluetooth® standard, or in accordance with any other suitable standardized or non-standardized wireless communication means.

The presently disclosed features provide a generic timeline and interface concept for a multi-radio controller which can be used to define scheduling services for various types of current and future radio system(s)/protocol(s) supported by the radio access units 12, 14, such as one or more of the above-mentioned standards and their extensions (like HSDPA, HSUPA and LTE in the case of 3GPP/UMTS), DVB-H, GPS, Galileo. However, it is to be noted that the application of the present embodiments is not limited to any particular radio unit(s).

The apparatus or the units thereof could be in the form of a chip unit or some other kind of hardware module for, controlling a communications device. Such hardware module comprises a connector for connecting the communications device mechanically and/or functionally. Thus, the hardware module may form a part of the device and could be removable. Some examples of such a hardware module include a sub-assembly or an accessory device. For instance, there could be a chip unit embodying the multi-radio controller 16 and a plurality of radio access units 12, 14.

The apparatus may be implemented as an electronic digital computer, which may comprise memory, a central processing unit (CPU), and a unit clock. The CPU may comprise a set of registers, an arithmetic logic unit, and a control unit. The control unit is controlled by a sequence of program instructions transferred to the CPU from the memory. The control unit may contain a number of microinstructions for basic operations. The implementation of microinstructions may vary, depending on the CPU design. The program instructions may be coded by a programming language, which may be a high-level programming language, such as C, C++, Ada, etc., or a low-level programming language, such as a machine language, or an assembler. The electronic digital computer may also have an operating unit, which may provide unit services to a computer program written with the program instructions.

An embodiment provides a computer program embodied on a distribution medium, comprising program instructions which, when loaded into an electronic apparatus, constitute one or more of the modules illustrated above and/or the further scheduling service related features illustrated below in connection with FIGS. 3 to 6. The computer program may be in source code form, object code form, or in some intermediate form, and it may be stored on a data storage medium or carrier, which may be any entity or device capable of carrying the program.

At least some functions or units of the apparatus may be implemented as one or more integrated circuits, such as application-specific integrated circuits ASIC. Other hardware embodiments are also feasible, such as a circuit built of separate logic components. A hybrid of these different implementations is also feasible.

The use of a radio-independent interface 18 for scheduling services facilitates addition of new radios to an existing platform. To make this feasible in a multi-radio device, a new radio should be controllable by the multi-radio controller 16 in accordance with the predefined form specified for the interface 18. Because the time domain behavior of a new radio is generally not known during design, a solution where a radio controller understands the behavior of all controlled radio protocols is not feasible. The scheduling control interface 18 is designed in a generalized manner to provide general-purpose scheduling services, which different radio units 12, 14 can use to generate the air access requests they need. Examples of interference, which the presently disclosed multi-radio controller arrangement may be configured to avoid or at least reduce, include: RF blocking (the receiver is unable to receive a full strength input signal due to a simultaneously active transmitter at a close frequency), wide band noise caused by non-ideal frequency synthesizers, harmonic frequencies of a transmitter located in a receiver band, and intermodulation caused by mixing together signals of two or more simultaneously active transmitters, when formed new frequencies may be located in a receiver band.

Figure 3:
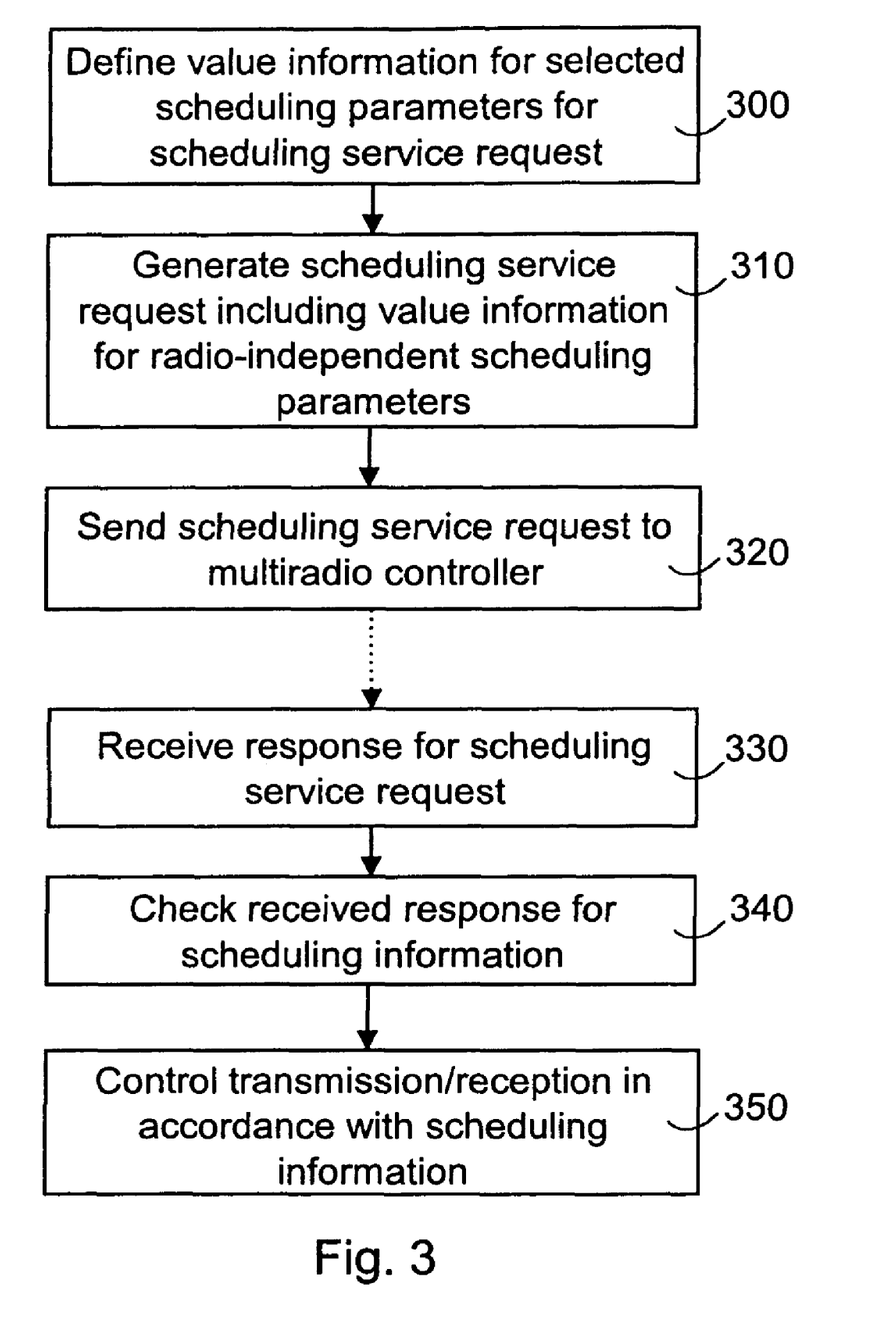
FIG. 3 illustrates a method according to an embodiment.

Let us now further study the interface 18 and the actions in the MRC 16 and the RAUs 12, 14. FIG. 3 illustrates a method according to an embodiment. The steps illustrated in FIG. 3 may be applied to a radio access unit (controller) 12, 14 requesting radio access scheduling services. In response to a need to request scheduling services, value information is defined 300 for selected ones of the scheduling parameters of the radio independent interface 18 for scheduling service requests. A scheduling service request in a predefined form required in the interface 18 is generated 310, the request including the value information on radio-independent scheduling parameters desired by the radio access unit in question. The scheduling service request is sent 320 to the multi-radio controller 16 over the interface 18.

Later, a response to the scheduling service request is received 330 from the MRC 16 over the interface 18. Scheduling information in the received response is checked 340. Transmission or reception is controlled 350 in accordance with the scheduling information in the received response. The scheduling information may simply indicate if the requested schedule was allowed or denied. In one embodiment, the response may comprise further information on an allowed schedule, such as a general schedule calculated for the radio access units 12, 14.

Figure 4:
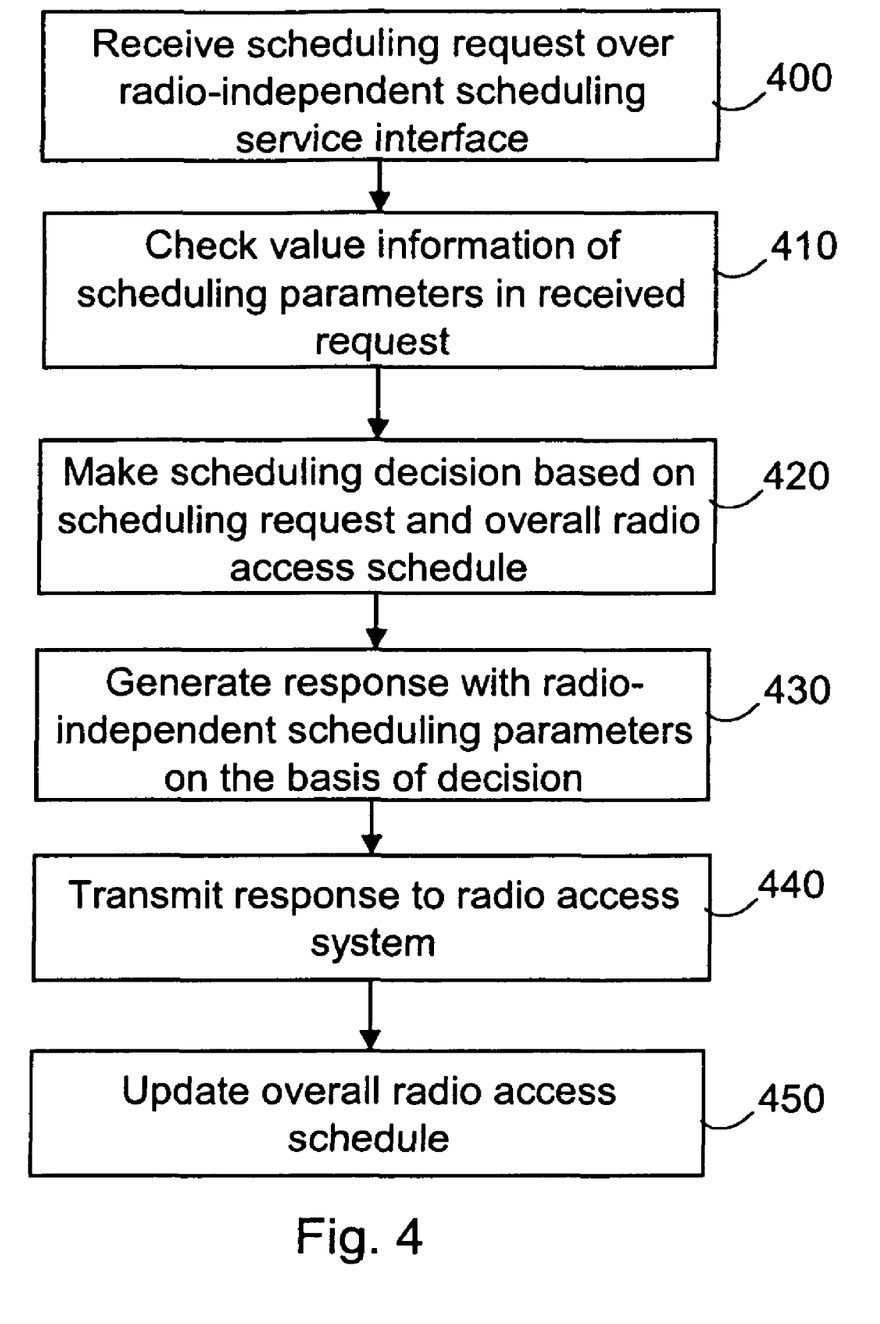
FIG. 4 illustrates a method according to an embodiment.

FIG. 4 illustrates a method according to an embodiment. The steps illustrated in FIG. 4 may be applied to the multi-radio controller 16 providing radio access scheduling services over the interface 18 common to the radio access units 12, 14.

A scheduling request is received 400. For instance, the request may be received from a radio access unit 12, 14 operating in accordance with the method of FIG. 3. The scheduling request comprises value information on at least some of the scheduling parameters in a pre-specified form in accordance with the radio independent control interface common to the radio access units. Value information on the received parameters is checked 410.

A radio access scheduling decision is made 420 on the basis of the value information on at least some of the scheduling parameters in the request and an overall radio access schedule. The overall radio access schedule maintains information on scheduled radio transmissions of the radio access units 12, 14 controlled by the multi-radio controller 16.

A number of ways and algorithms exist to implement the radio access scheduling, and such algorithms are not described in detail herein. For instance, requested transmission or reception time(s) is compared to already allowed transmission or reception times, but also further parameters may be taken into account. If there is no reservation in the overall radio access schedule for the requested time slot, i.e. no other radio needs access at the requested time slot, the request may be directly allowed. If there is at least a partial overlap, the request may be rejected or further radio access related control action may be initiated, for instance to reduce transmission power.

A response to the request is generated 430. The response may at least indicate whether or not the request was allowed. The response is formed to meet a pre-specified form in accordance with the control interface 18 common to the radio access units 12, 14. The response is sent 440 to the requesting radio access unit 12, 14.

The overall radio access schedule is updated 450 in accordance with the scheduling decision of step 420, if necessary. The overall radio access schedule may be implemented in various ways and it may generally refer to a set of requests received from the radio access units 12, 14 and the decisions made by the MRC 16 on the basis of the requests.

In one embodiment, the MRC 16 is arranged to use the requested transmission time (window) as the main parameter when making radio access scheduling decisions 420. Hence, also the overall radio access schedule may be updated based on and reflecting the allowed time slots. The overall radio access schedule may reflect rules created based on the scheduling decisions 420.

It is to be noted that the above features represent only some examples of available ways to implement the present features related to arranging a scheduling service over the radio-independent interface between the scheduling service provided, such as the multi-radio controller 16, and scheduling service users, such as the radio access units 12, 14. Various modifications can be made and some of the steps may be carried out in a different order. For instance, step 450 may precede step 440, and it may be carried out directly after the decision of step 420.

In one embodiment, the control interface 18 between the radio access units 12, 14 and the multi-radio controller 16 is pre-specified with two or more categories of scheduling requests, i.e. the entities communicating over the interface are able to differentiate between such categories of scheduling requests. Each radio access unit 12, 14 may be configured to select an appropriate category for a scheduling request being generated 310 and specify the scheduling request category in a scheduling request. The multi-radio controller 16 may be arranged to process the scheduling requests in accordance with such category information, and serve a received scheduling request in accordance with its category.

From the point of view of MRC 16 scheduling, radio communication may be classified into three categories: Periodic classification means that radio operation (transmission or reception) is repeated at fixed intervals. Single classification is used to schedule occasional, non-periodic operations. Continuous classification is for radio operation which is active continuously or for a long time compared to scheduling time, for instance an FM radio receiver.

An embodiment comprises a first scheduling request category for periodic type of radio access, a second scheduling request category for continuous type of radio access, and a third scheduling request category for single type of radio access. However, these are only some examples and various other categorizations are encompassed for differentiating scheduling services. Some parameters for use in scheduling requests of these categories are illustrated below in Table 1.

The set of radio independent scheduling parameters over the radio independent interface 18 may comprise a first sub-set of parameters for use in each scheduling request and a second sub-set of scheduling parameters specific to a scheduling request category.

Table 1 below illustrates scheduling parameters for different categories according to an embodiment. As indicated, there may be a number of scheduling parameters common to all scheduling request categories. Some or all of these Common scheduling parameters may be used in all scheduling request categories, i.e. it may be adequate to include values only for some of the parameters in certain types of requests.

TABLE 1

Scheduling parameters

Common Parameters (common to all scheduling requests)

| | |
|---|---|
| Radio Unit specification (unit, variant) | Identifies radio unit requesting access |
| Band | Transmitting/receiving band (Hz) |
| Bandwidth | Transmitting/receiving bandwidth (Hz) |
| TX power | Transmission power (TX only), dBm |
| Crest factor | Power peak-to-average ratio, dB |
| RX RSS | Received signal strength (RX only), dBm |
| Priority | Traffic priority, 0, . . . , n, 0 = highest |
| Traffic type | Periodic/single/continuous |

"Periodic"-type scheduling parameters

| | |
|---|---|
| Start time, stop time | Defines required activity time in radio time units (tick/symbol) |
| Repeat delay | Idle period between two consecutive active periods in radio time units |
| Number of repeats | How many times activity period is repeated |
| Margin | Additional scheduling margin, radio time units or microseconds. Allows for inaccuracy in time synchronization if long periods are requested. |

"Single"-type scheduling parameters

| | |
|---|---|
| Start time, stop time | Defines required activity time in radio time units (tick/symbol) |
| Margin | Additional scheduling margin, radio time units or microseconds |

"Continuous"-type scheduling parameters

| | |
|---|---|
| Min. duty % | Minimum percentage of activity time needed during some period |
| Averaging period | Time period used calculating duty %, microseconds |
| Max. break length | Maximum allowed discontinuity, microseconds |

It is to be noted that the above parameters represent some examples of applicable parameters and the application of the present features is not limited to the use of any particular parameters. The above illustrated and further parameters may be used in various ways in different scheduling request categories. Further, some or all of the above parameters may be applied to a unit applying different or no categorization of scheduling requests and parameters.

At least some of the scheduling requests or scheduling request categories may be prioritized. Such priority information may influence the processing of a request. The MRC 16 may be arranged to check priority information associated with the received scheduling request. This may be carried out in connection with checking 410 information in the received scheduling request, for instance. The priority information may be explicitly included by an RAU 12, 14 (310) in the scheduling request, or it can be derived e.g. on the basis of the scheduling request category.

The priority associated with the request (category) may affect the processing (420) or processing order of the requests, or even an already made scheduling decision. In one embodiment, the MRC 16 is arranged to override a previously made scheduling decision for a first action if a newly requested second action has a higher priority than the first action and these two actions interfere with each other.

A specific time window may be defined for each of the categories of scheduling requests. The MRC 16 may be pre-specified with or dynamically allocate arrival time(s) or time window(s) scheduling request category specifically and may be arranged to apply such time windows when receiving 400 scheduling requests. A radio access unit 12, 14 may be informed of or pre-specified with timing information on scheduling request categories and send 320 a scheduling request in a time window allocated to the category of the scheduling request. In another embodiment, the radio access units 12, 14 may send scheduling requests when necessary, and the MRC 16 handles received scheduling requests by applying a scheduling request processing or serving algorithm, for instance causing processing of the requests in a predefined order and/or within a pre-specified time window.

Figure 5:
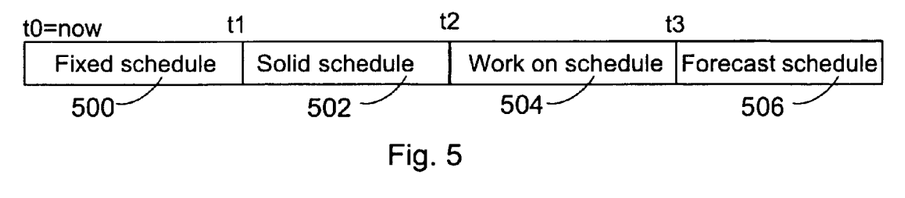
FIG. 5 illustrates a scheduling timeline example according to an embodiment.

Reference is now made to FIG. 5 illustrating an example of how time windows may be allocated to different kinds of scheduling requests.

A scheduling timeline has four different time zones. In x-axis t0 means current time, and t1, t2 and t3 future time such that t3 refers furthest to the future. The scheduling timeline defines a basis for an air interface scheduling service the MRC 16 provides for radio access units 12, 14.

Starting from the right, the first zone 506 is referred to as a forecast schedule. First, the MRC 16, or the scheduler 200 thereof, processes scheduling requests of periodic and continuous type, and allocates time to them based on a prioritization algorithm if interference is detected between requested actions, for instance first allocating time to a request of highest priority. There are two reasons for handling periodic requests first: They are usually known well in advance and high priority traffic, such as a cellular voice call, usually uses periodic radio access.

The second zone 504 is referred to as work on schedule. Periodic requests are allocated before time t3 and the next step is to allocate single schedule requests. If a requested action has a higher priority than a previously accepted periodic scheduling action and these two actions interfere with each other, a previously made scheduling decision may be overridden. Because the calculated intermediate schedule is not yet communicated back to the radio access units 12, 14, necessary changes are easy to make.

The third zone 502 is referred to as a solid schedule. After time t2, the overall schedule should be completed for all type of schedule requests, and it can be communicated to the radios 12, 14. However, there may be situations where the scheduling demand is not known before time t2: For instance, this may occur when applying fast retransmission in the case of failure in some protocols. These decisions can still be made between time t2 and t1, but they require changes in the schedule already communicated back to the radio access units 12, 14 and, in that sense, are costly and may require special arrangements.

The fourth zone 500 is referred to as a fixed schedule. Scheduling decisions cannot be changed any more when less than t1 time is left. This time limit represents the physical constraint of the underlying platform: RF hardware should be configured correctly before being used, and this requires time, for instance. Communicating the schedule to the radio access units 12, 14 using e.g. a shared bus also introduces latency, and thus affects the timing parameters t1 . . . t3.

Actual values of the timing parameters t1 . . . t3 may be unit design parameters. By further analysis and optimization, a desirable balance can be found between the quality of the MRC schedule and radio access unit requirements, such as buffering, computation load, communication latency etc. For example, if the scheduler 200 in some platform has more computational resources and faster communication between radios, t2 can be moved closer to t1 and the need to handle exceptional schedule requests is reduced.

Figure 6:
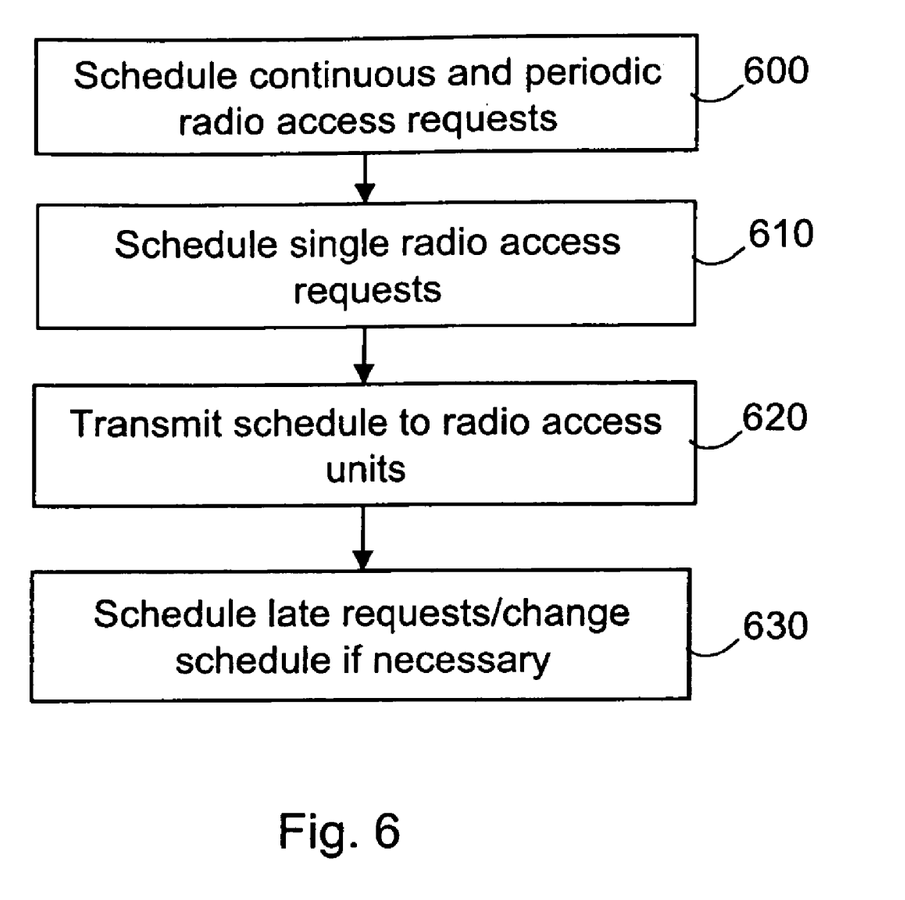
FIG. 6 illustrates a method according to an embodiment.

FIG. 6 illustrates a method of processing scheduling requests. The MRC 16 may comprise a buffer for incoming scheduling requests. The MRC 16 may be arranged to serve the arrived scheduling requests in the manner illustrated in F*igure* 6.

In step 600, continuous and periodic scheduling requests are served first. Then, in step 610, single radio access (scheduling) requests are served. In step 620, a schedule is sent to radio access units 12, 14. Hence, it is to be noted that, instead of or in addition to informing each radio access unit 12, 14 separately, the MRC 16 may send an overall schedule to all radio access units 12, 14 in (indirect) response to a scheduling request. In step 640, possible later requests are served. Any necessary changes may also be made to the schedule.

In one embodiment, the MRC 16 is kept aware of the radio time of each RAU 12, 14. An RAU 12, 14 is responsible for keeping the MRC 16 up to date of its time and report changes therein, for instance time advances. For more information on the implementation of radio time concept, reference is made to patent application No. PCT/FI2007/050386, incorporated herein as a reference. Thus, a controlling apparatus may be provided, the controlling apparatus being configured to: search for at least one predetermined conversion function; check a system time of at least one radio protocol; define a common multi-radio reference time; convert the system time of at least one radio protocol to the common multi-radio reference time with the at least one conversion function and process control commands in the common multi-radio reference time, and/or convert the common multi-radio reference time to the system time of at least one radio protocol with the at least one conversion function and process control commands in the system time.

In one embodiment, the MRC 16 is configured to perform these functions so as to provide a common multi-radio reference time and system time for at least some of the RAUs 12, 14, but it is also possible to implement the conversion function outside the MRC 16. Further, at least some of the embodiments and conversion functions further illustrated on pages 5 to 17 of the cited application may be applied to the presently disclosed multi-radio control system, in one embodiment by the MRC 16. The MRC 16 may keep track of static offsets of each of the RAUs 12, 14, which may be updated e.g. when a GSM transceiver synchronizes with a base station.

It will be obvious to a person skilled in the art that as technology advances, the inventive concept can be implemented in various ways. The invention and its embodiments are not limited to the examples described above but may vary within the scope of the claims. The features of the embodiments described herein may be combined in all possible combinations of methods, apparatuses, modules, units, and computer program products. The combinations of claim elements as stated in the claims can be changed in a number of different ways and still be within the scope of various embodiments of the invention.

The invention claimed is:

1. An apparatus, comprising:
a multi-radio controller configured to provide radio access scheduling services for a plurality of radio access units over a control interface with a set of radio independent scheduling parameters for the radio access units,
the multi-radio controller further comprising,
a receiver configured to receive a scheduling request comprising value information on at least some of the radio independent scheduling parameters in a given form in accordance with the control interface common to the radio access units,
a scheduler configured to schedule radio access on the basis of the value information on at least some of the radio independent scheduling parameters, and
a sender configured to send a response to the scheduling request in a given form in accordance with the control interface common to the radio access units,
wherein two or more categories of scheduling requests are predefined by the control interface between the radio access units and the multi-radio controller, and the scheduling request indicates its category,
wherein the multi-radio controller is configured to serve the scheduling request in accordance with its category, and
wherein the set of radio independent scheduling parameters comprises a first sub-set of parameters to be used in each scheduling request and a second sub-set of scheduling parameters specific to a scheduling request category.

2. The apparatus according to claim 1, wherein the multi-radio controller is configured to use a specific time window for arrival and/or processing of scheduling requests of a particular category.

3. The apparatus according to claim 1, wherein the two or more categories of scheduling requests comprise a first scheduling request category for periodic type of radio access, a second scheduling request category for continuous type of radio access, and a third scheduling request category for single type of radio access.

4. The apparatus according to claim 3, wherein the multi-radio controller is configured to serve continuous and periodic radio access scheduling requests before single radio access scheduling requests, and
wherein the multi-radio controller is configured to send a schedule to the radio access units after serving any single radio access scheduling requests.

5. The apparatus according to claim 1, wherein the multi-radio controller is configured to check priority information associated with the received scheduling request, and
wherein the multi-radio controller is configured to override a previously made scheduling decision for a first action if a newly requested second action has a higher priority than the first action and these two actions interfere with each other.

6. The apparatus according to claim 1, wherein the apparatus is a multi-radio mobile station comprising the radio access units.

7. The apparatus according to claim 1, wherein the apparatus is embodied in a chipset.

8. An apparatus, comprising:
a controller configured to generate a scheduling request comprising value information on radio independent scheduling parameters in a given form in accordance with a predefined control interface common to a plurality of radio access units;
a sender configured to send the scheduling request to a multi-radio controller; and
a receiver configured to receive a response to the scheduling request over the control interface,
wherein the controller or another controller is configured to control radio access transmission or reception in response to the received response,
wherein two or more categories of scheduling requests are predefined by the control interface between the radio access units and the multi-radio controller,
wherein the controller or the another controller is configured to indicate a scheduling request category in the scheduling request, and
wherein the set of radio independent scheduling parameters comprises a first sub-set of parameters to be used in each scheduling request and a second sub-set of scheduling parameters specific to a scheduling request category.

9. The apparatus according to claim 8, wherein the sender is configured to send the scheduling request in a specific time window allocated to the category of the scheduling request.

10. The apparatus according to claim 8, wherein the two or more categories of scheduling requests comprise a first scheduling request category for periodic type of radio access, a second scheduling request category for continuous type of radio access, and a third scheduling request category for single type of radio access.

11. The apparatus of claim 10, wherein the receiver is configured to receive a schedule from the multi-radio controller, and
wherein the controller or the another controller is configured to control the radio access transmission or reception in accordance with the received schedule.

12. The apparatus according to claim 8, wherein the apparatus is a multi-radio mobile station comprising a plurality of radio access units and the multi-radio controller.

13. The apparatus according to claim 8, wherein the apparatus is embodied in a chipset.

14. A method, comprising:
receiving a scheduling request comprising value information on at least some of radio independent scheduling parameters of a control interface common to a plurality of radio access units;
scheduling radio access on the basis of the value information on at least some of the radio independent scheduling parameters; and
sending a response to the scheduling request in a given form in accordance with the control interface common to the radio access units,
wherein two or more categories of scheduling requests are predefined by the control interface and the scheduling request indicates its category,
wherein the scheduling request is served in accordance with its category, and
wherein the set of radio independent scheduling parameters comprises a first sub-set of parameters to be used in each scheduling request and a second sub-set of scheduling parameters specific to a scheduling request category.

15. The method according to claim 14, wherein a specific time window is used for reception and/or processing of scheduling requests of a particular category.

16. The method according to claim 14, wherein the two or more categories of scheduling requests comprise a first scheduling request category for periodic type of radio access, a second scheduling request category for continuous type of radio access, and a third scheduling request category for single type of radio access.

17. The method according to claim 16, wherein continuous and periodic radio access scheduling requests are served before single radio access scheduling requests, and
wherein a schedule is sent to the radio access units after serving any single radio access scheduling requests.

18. The method according to claim 14, comprising:
checking priority information associated with the received scheduling request; and
overriding a previously made scheduling decision for a first action if a newly requested second action has a higher priority than the first action and these two actions interfere with each other.

19. A method, comprising:
generating a scheduling request comprising value information on radio independent scheduling parameters in a given form in accordance with a predefined control interface common to a plurality of radio access units;
sending the scheduling request to a multi-radio controller;
receiving a response to the scheduling request over the control interface; and
controlling radio access transmission or reception in response to the received response,
wherein two or more categories of scheduling requests are predefined by the control interface,
wherein a scheduling request category is indicated in the scheduling request, and
wherein the set of radio independent scheduling parameters comprises a first sub-set of parameters to be used in each scheduling request and a second sub-set of scheduling parameters specific to a scheduling request category.

20. The method according to claim 19, wherein a specific time window allocated to the category of the scheduling request is applied when sending the scheduling request.

21. The method according to claim 19, wherein the two or more categories of scheduling requests comprise a first scheduling request category for periodic type of radio access, a second scheduling request category for continuous type of radio access, and a third scheduling request category for single type of radio access.

22. The method of claim 21, wherein a schedule is received from the multi-radio controller, and
wherein the radio access transmission or reception is controlled in accordance with the received schedule.

23. A computer program embodied on a non-transitory computer readable medium for controlling a processor to implement a method, the method comprising:
receiving a scheduling request comprising value information on at least some of radio independent scheduling parameters of a control interface common to a plurality of radio access units;
scheduling radio access on the basis of the value information on at least some of the radio independent scheduling parameters; and
sending a response to the scheduling request in a given form in accordance with the control interface common to the radio access units,
wherein two or more categories of scheduling requests are predefined by the control interface and the scheduling request indicates its category,
wherein the scheduling request is served in accordance with its category, and
wherein the set of radio independent scheduling parameters comprises a first sub-set of parameters to be used in each scheduling request and a second sub-set of scheduling parameters specific to a scheduling request category.

24. A computer program embodied on a non-transitory computer readable medium for controlling a processor to implement a method, the method comprising:
generating a scheduling request comprising value information on radio independent scheduling parameters in a given form in accordance with a predefined control interface common to a plurality of radio access units;
sending the scheduling request to a multi-radio controller;
receiving a response to the scheduling request over the control interface; and
controlling radio access transmission or reception in response to the received response,
wherein two or more categories of scheduling requests are predefined by the control interface,
wherein a scheduling request category is indicated in the scheduling request, and wherein the set of radio independent scheduling parameters comprises a first sub-set of parameters to be used in each scheduling request and a second sub-set of scheduling parameters specific to a scheduling request category.

25. An apparatus, comprising:

receiving means for receiving a scheduling request comprising value information on at least some of radio independent scheduling parameters of a control interface common to a plurality of radio access units;

scheduling means for scheduling radio access on the basis of the value information on at least some of the radio independent scheduling parameters; and sending means for sending a response to the scheduling request in a given form in accordance with the control interface common to the radio access units, wherein two or more categories of scheduling requests are predefined by the control interface and the scheduling request indicates its category, wherein the scheduling request is served in accordance with its category, and wherein the set of radio independent scheduling parameters comprises a first sub-set of parameters to be used in each scheduling request and a second sub-set of scheduling parameters specific to a scheduling request category.

26. An apparatus, comprising:

generating means for generating a scheduling request comprising value information on radio independent scheduling parameters in a given form in accordance with a predefined control interface common to a plurality of radio access units;

sending means for sending the scheduling request to a multi-radio controller;

receiving means for receiving a response to the scheduling request over the control interface; and controlling means for controlling radio access transmission or reception in response to the received response, wherein two or more categories of scheduling requests are predefined by the control interface, wherein a scheduling request category is indicated in the scheduling request, and wherein the set of radio independent scheduling parameters comprises a first sub-set of parameters to be used in each scheduling request and a second sub-set of scheduling parameters specific to a scheduling request category.

* * * * *